March 16, 1937.     P. R. GEROW     2,074,260
SAFETY GAUGE FOR BATTERIES
Filed Dec. 24, 1934

INVENTOR
Percy Roy Gerow
By Ralph Burch
Attorney

Patented Mar. 16, 1937

2,074,260

UNITED STATES PATENT OFFICE 2,074,260

SAFETY GAUGE FOR BATTERIES

Percy Roy Gerow, Graysville, Manitoba, Canada

Application December 24, 1934, Serial No. 759,120

1 Claim. (Cl. 200—84)

This invention relates to improvements in a battery gauge, etc., its primary object being to provide means whereby the operator of a car may observe the condition of the battery thereof at all times.

A further object is to provide a filler opening cap for attaching to storage batteries having a float controlled circuit closer incorporated therein for actuating a signal circuit to denote the condition of the battery.

With these and other objects in view that may appear while the description proceeds, the invention consists in the novel construction and arrangement of parts as hereinafter more specifically set forth, claimed and shown in the accompanying drawing forming a part of this present application and in which:—

Figure 1:
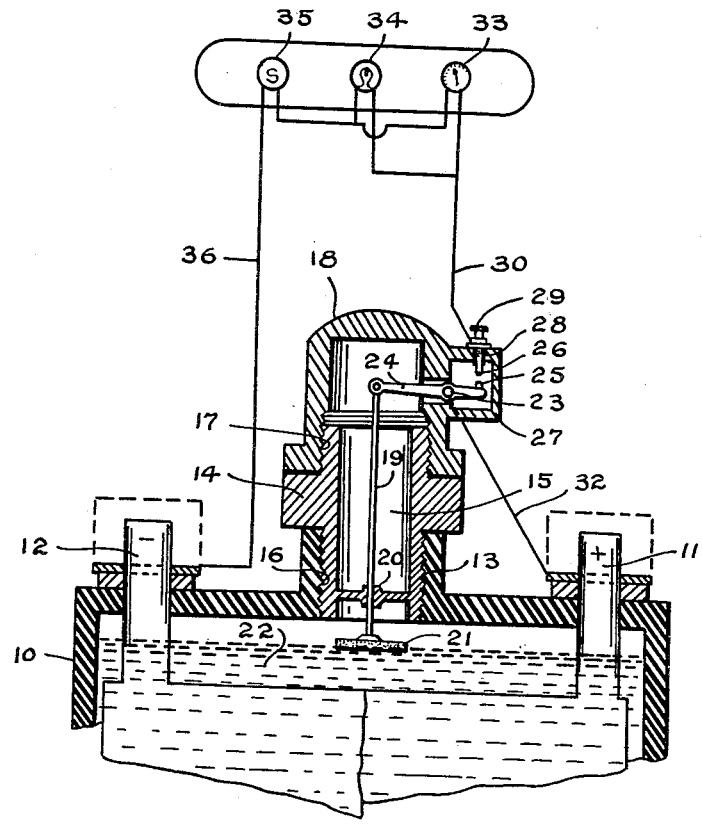
Fig. 1 is a cross sectional view of the device as attached to a battery.
Figure 2:
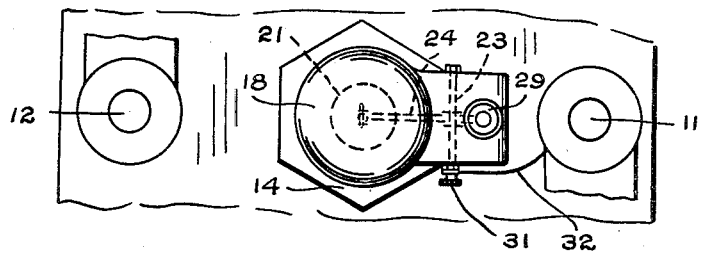
Fig. 2 is a plan view of the same.

Referring more in detail to the drawing in which similar reference characters designate corresponding parts throughout the several views it will be seen that the invention comprises a battery 10 of any standard type or manufacture having thereon a positive post 11, a negative post 12 and the water filling orifice 13. It is in this orifice 13 that the battery tester is attached. Said battery tester comprises a member 14 having a central cavity 15, therethrough and an external lower thread 16 engaging the thread of the battery orifice. An upper external thread 17 is likewise provided on said member and is engaged by the cover 18. Centrally disposed in the member 14 is a rod 19 slidably mounted in a bearing 20. On the lower end of the said rod is a float 21, which depends from the battery testing equipment to the liquid 22 in the battery cells, said rod and float being made of glass to resist corrosion. Pivotally mounted on a pivot pin 23 is an arm 24 which is pivotally connected to the top of the rod 19. The outer end of the said arm supports a contact point 25 which registers with a contact point 26, secured in a housing 27 from which it is insulated by an insulating tube 28. A binding post 29 is formed on the upper end of the same and the connecting lead 30 secured thereto. The pivot pin 23 is likewise provided with a binding post 31, to which the positive lead 32 from the post 11 is connected. The volt meter 33 and the lamp 34 are connected in parallel on the positive lead 30 and the switch 35 is in the return or negative lead 36 which connects to ground or the negative post 12.

In operation the float rises and falls with the liquid in the cell. Should the same drop below a predetermined level the float actuates the arm 24 by means of the rod 19 and causes the contact points 25 and 26 to engage each other thereby closing the circuit and lighting the lamp 34 which warns the operator of the condition of the liquid, and the meter at the same time registers the voltage of the battery. The switch is provided to prevent an excessive discharge as the circuit may be opened until the level of the liquid is rectified.

It is believed that the construction and advantages of the structure shown will be apparent from the foregoing paragraphs taken in conjunction with the accompanying drawing without further detailed description.

While the preferred embodiment of the invention has been disclosed it is understood that minor changes in the details of construction and combination and arrangement of co-operating elements may be resorted to within the scope of what is claimed without departing from the spirit of the invention.

I claim:

A combined filler opening cap and circuit closer housing for storage batteries comprising a tubular member having one of its ends provided with screw threads for engagement with the filler opening of a battery, a screw cap threaded on the upper end of said member, an off-set chamber formed integral with one side of said cap, the wall between said cap and chamber having a relatively small passage establishing communication between said cap and chamber, a bearing in the lower end of said member, a rod slidably mounted in said bearing and extending beyond the ends of said member, a float attached to the lower end of said rod, a rocker arm pivotally mounted in the passage between said cap and chamber having one end pivotally connected to the upper end of said rod and its opposite end disposed in said chamber, a contact point carried by the end of said arm in said chamber, and a second contact point mounted in the top wall of said chamber adapted to be engaged by said contact point carried by said arm, when said float drops below a pre-determined level.

PERCY ROY GEROW.